(12) United States Patent
Katada

(10) Patent No.: US 9,742,240 B2
(45) Date of Patent: Aug. 22, 2017

(54) VIBRATING COMPACT MOTOR WITH ATTACHED FLEXIBLE CIRCUIT BOARD FOR A MOBILE DEVICE

(71) Applicant: Nidec Copal Corporation, Itabashi-ku, Tokyo (JP)

(72) Inventor: Yoshinori Katada, Saitama-Ken (JP)

(73) Assignee: NIDEC COPAL CORPORATION, Tokyo (JP)

( * ) Notice: Subject to any disclaimer, the term of this patent is extended or adjusted under 35 U.S.C. 154(b) by 264 days.

(21) Appl. No.: 14/132,530

(22) Filed: Dec. 18, 2013

(65) Prior Publication Data
US 2014/0175955 A1    Jun. 26, 2014

(30) Foreign Application Priority Data

Dec. 26, 2012    (JP) .................................. 2012-283381

(51) Int. Cl.
*H02K 11/00*    (2016.01)
*H02K 5/22*    (2006.01)
(Continued)

(52) U.S. Cl.
CPC ............... *H02K 5/225* (2013.01); *H02K 5/04* (2013.01); *H02K 5/24* (2013.01); *H02K 7/061* (2013.01);
(Continued)

(58) Field of Classification Search
CPC .......... H02K 5/225; H02K 5/005; H02K 5/04; H02K 5/524; H02K 5/526; H02K 5/704;
(Continued)

(56) References Cited

U.S. PATENT DOCUMENTS 5,661,352 A * 8/1997 Oguchi .................. H02K 5/225
310/156.26
5,705,866 A * 1/1998 Oguchi .................. H02K 1/187
310/67 R
(Continued)

FOREIGN PATENT DOCUMENTS

| JP | 2002-96025 A | 4/2002 |
| JP | 2002096025 A * | 4/2002 |
| JP | 2007104757 A * | 4/2007 |

OTHER PUBLICATIONS

Translation of JP 2002096025A.*
(Continued)

*Primary Examiner* — Michael Andrews
*Assistant Examiner* — Maged Almawri
(74) *Attorney, Agent, or Firm* — Troutman Sanders LLP

(57) ABSTRACT

A compact motor which avoids peeling and cracking of the circuit board wiring pattern upon bending the printed circuit board. A projecting part (13), projecting toward the bottom side of the bracket (5), is provided on the back surface (5c) of the bracket (5) of a compact motor. A board insertion groove (S) is formed between the projecting part (13) and the back surface (5c). The flexible printed circuit board (10), inserted inside the board insertion groove (S), abuts the projecting part (13) and is bent facing the back. When the printed circuit board (10) is inserted into the board insertion groove (S) and bent, the printed circuit board (10) is in a state abutting the curved part (13a) of the projecting part (13), so the curved part (13a) of the projecting part (13) regulates bending and, by doing this, stabilizes bending of the flexible printed circuit board (10).

11 Claims, 15 Drawing Sheets

(51) Int. Cl.
*H02K 7/18* (2006.01)
*H02K 5/24* (2006.01)
*H02K 7/06* (2006.01)
*H02K 5/04* (2006.01)
*H02K 11/30* (2016.01)
*H02K 11/33* (2016.01)

(52) U.S. Cl.
CPC ......... *H02K 7/1876* (2013.01); *H02K 7/1892* (2013.01); *H02K 11/30* (2016.01); *H02K 11/33* (2016.01); *H02K 2211/03* (2013.01)

(58) Field of Classification Search
CPC ........ H02K 5/706; H02K 11/33; H02K 11/38; H02K 11/30; H02K 11/03; H02K 7/06; H02K 7/061; H02K 7/1876; H02K 7/1892; H02K 2211/03; H02K 2211/06; H03H 9/1007
USPC .................. 310/91, 81, 71, 68 R; 340/407.1; 318/128
See application file for complete search history.

(56) References Cited

U.S. PATENT DOCUMENTS

| | | | | |
|---|---|---|---|---|
| 5,730,619 A * | 3/1998 | Hamlin | .................. | H01R 12/57 439/493 |
| 6,121,701 A * | 9/2000 | Kloeppel | ........... | G11B 19/2009 310/71 |
| 6,271,610 B1 * | 8/2001 | Ibata | ........................ | H02K 5/00 310/40 MM |
| 6,413,117 B1 * | 7/2002 | Annerino | ................. | H02K 5/00 439/500 |
| 7,579,731 B2 * | 8/2009 | Fukushima | .............. | H02K 3/47 310/141 |
| 7,646,122 B2 * | 1/2010 | Uchiumi | ................... | H02K 5/00 310/71 |
| 7,825,555 B2 * | 11/2010 | Uchiumi | ................... | H02K 5/00 310/81 |
| 2001/0013730 A1 * | 8/2001 | Yamaguchi | ............ | H02K 7/063 310/81 |
| 2005/0046302 A1 * | 3/2005 | Suzuki | ................... | H02K 7/061 310/239 |
| 2005/0073205 A1 * | 4/2005 | Takagi | ...................... | H02K 5/00 310/89 |
| 2006/0138885 A1 * | 6/2006 | Uchiumi | ................... | H02K 5/00 310/81 |
| 2008/0291650 A1 * | 11/2008 | Hautvast | ................ | H02K 5/225 361/772 |
| 2009/0039721 A1 * | 2/2009 | Takagi | ................... | H02K 5/225 310/81 |
| 2010/0102645 A1 * | 4/2010 | Trietz | ....................... | H02N 2/04 310/12.31 |
| 2011/0291510 A1 * | 12/2011 | Hara | ........................ | H02K 5/04 310/91 |

OTHER PUBLICATIONS

Translation of JP 2007104757A.*
14132530_20170531_14132530—527684—EICSEARCH Date Nov. 2, 2016 by Christian Miner.*

* cited by examiner

VIBRATING COMPACT MOTOR WITH ATTACHED FLEXIBLE CIRCUIT BOARD FOR A MOBILE DEVICE

This application claims priority from Japanese patent application serial no. 2012-283381 filed Dec. 26, 2012.

FIELD OF THE INVENTION

The present invention relates to a cylinder type compact motor.

BACKGROUND OF THE INVENTION

In the past, as technology for this kind of field, there is Unexamined Patent Publication No. 2002-96025. The compact motor noted in this publication has an end bracket provided at the back end of a cylinder shaped housing. Connection terminals are exposed from this end bracket, and a wiring pattern of a flexible printed circuit board (hereafter referred to as FPC) is electrically connected by solder. The FPC has a vertically long rectangular shape, this FPC is bent facing the inside along the outer surface of the cylindrical housing, and by doing this, the FPC extends in parallel to the housing. Then, the motor in this state is mounted inside a mobile electronic device, and electrical contact is made between the mobile electronic device external substrate and the FPC convex part contact point part. With this kind of constitution, it is not necessary to do wiring work to guide lead wires from the end bracket.

SUMMARY OF THE INVENTION

However, with the prior art compact motor described previously, the FPC is simply bent along the outer surface of the cylindrical housing, so there is the problem that the smaller the bending angle, the more likely it is that the FPC wiring pattern will peel away from the substrate at the bent part and that cracks will occur in the wiring pattern causing disconnects, and the more difficult it will be to stabilize the bend in the FPC.

An object of the present invention is to provide a compact motor made to avoid situations like the wiring pattern formed on the flexible printed circuit board peeling at the bent part or having cracks occur when the flexible printed circuit board fixed to a bracket is bent.

The present invention is a motor for which the end part of a flexible printed circuit board abuts the back surface of a bracket fixed to the back end of a housing, and a wiring pattern of the flexible printed circuit board is connected to connection terminals projecting backwards from the bracket, a compact motor comprising:

a projecting part projecting toward the outside of the radial direction of the motor provided on the back surface of the bracket, a board insertion groove formed between the projecting part and the back surface of the bracket, and the flexible printed circuit board inserted inside the board insertion groove bent along the projecting part.

With this compact motor, when the flexible printed circuit board inserted into the board insertion groove is bent along the projecting part, bending occurs in a state with the flexible printed circuit board abutting the projecting part, so the projecting part regulates the bending position of the flexible printed circuit board, and by doing this, the bending of the flexible printed circuit board is stabilized, and it is possible to reliably bend the flexible printed circuit board at a preset position. In the case that there is no projecting part or board insertion groove, the bend position in the flexible printed circuit board is not stabilized, and the bending force is applied to the connection location (solder part) of the connection terminals and the wiring pattern, so it is easy to have solder peeling, peeling from the wiring pattern material, or cracking of the wiring pattern occur. Furthermore, since, it is possible to connect the connection terminals and the wiring pattern using solder with the flexible printed circuit board inserted in the board insertion groove it is easy to set the flexible printed circuit board in position before doing soldering work, and as a result, alignment of the connection terminals and the wiring pattern is performed reliably, and soldering work is easy.

Also, on the projecting part, a convex curved part is formed so that the width of the board insertion groove expands toward the bracket bottom side.

With this configuration, it is possible to make the curvature at the bent part of the flexible printed circuit board dependent on the curved part and always keep it fixed, and by doing this, keep the load applied to the wiring pattern of the flexible printed circuit board at the bent part constant, making wiring pattern peeling and cracking less likely to occur.

Also, the wiring pattern of the flexible printed circuit board is extended to avoid the position at which the projecting part abuts the flexible printed circuit board when the flexible printed circuit board is bent via the projecting part.

This kind of constitution makes it so that when the projecting part contacts the flexible printed circuit board, the projecting part does not directly damage the wiring pattern. Therefore, it is possible to avoid peeling and cracking of the wiring pattern well.

With the present invention, when bending the FPC fixed to the bracket, it is possible to avoid the situation of the wiring pattern formed on the FPC having peeling or cracking occur at the bent part.

DETAILED DESCRIPTION OF THE PREFERRED EMBODIMENTS

Following, we will give a detailed description of a preferred embodiment of the compact motor of the present invention while referring to drawings. We will describe this using the extending direction of the rotation axis line L as "front-back," and the direction orthogonal to the rotation axis line L as "up-down." Also, the same or equivalent constitutional parts will be given the same code numbers, and redundant explanation will be omitted.

Figure 1:
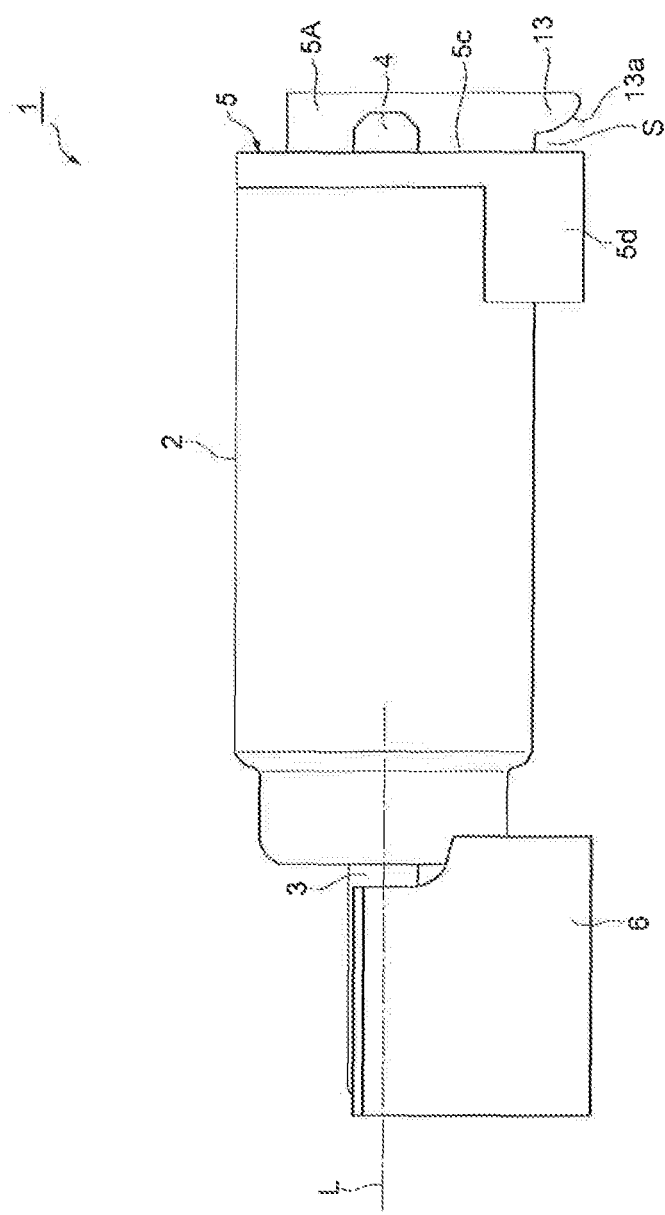
FIG. 1 is a side view showing a first embodiment of the compact motor of the present invention.
Figure 2:
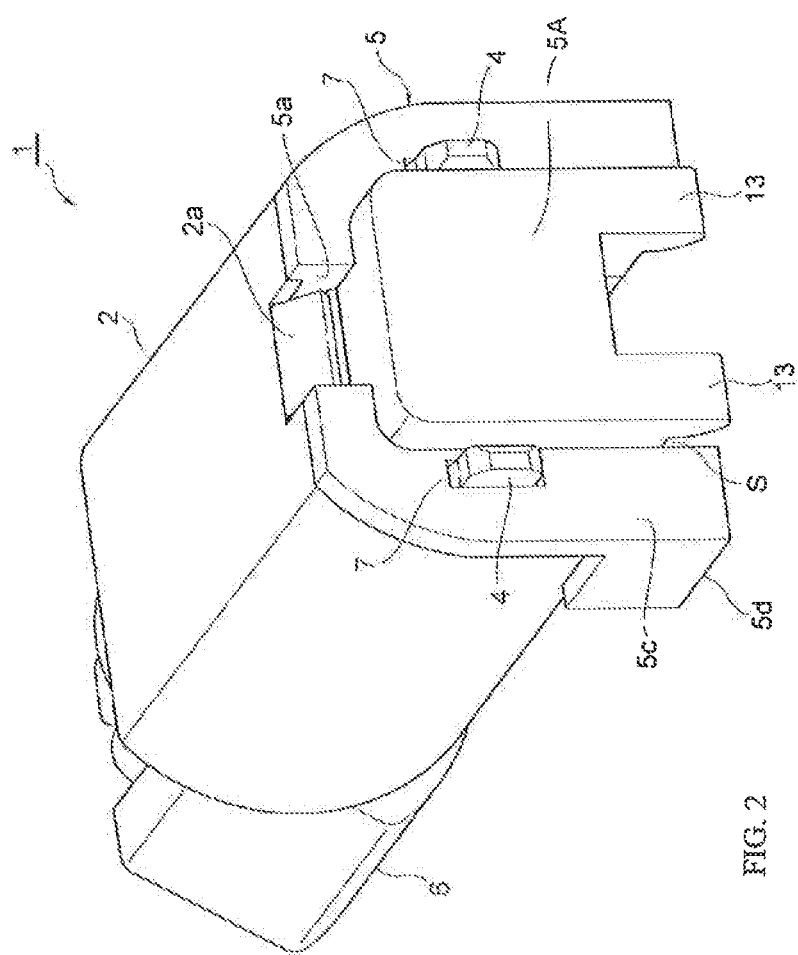
FIG. 2 is a perspective view of the motor shown in FIG. 1.
Figure 3:
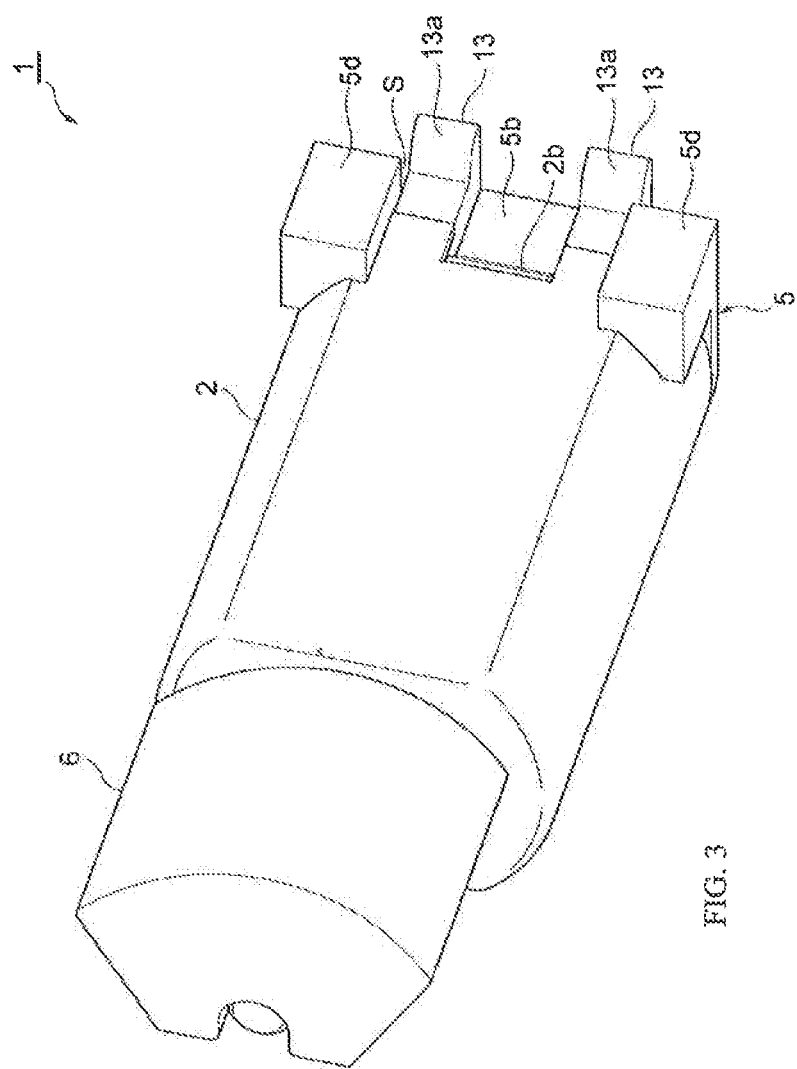
FIG. 3 is a perspective view of the motor shown in FIG. 2 seen from a different angle.

As shown in FIG. 1 to FIG. 3, the vibration motor 1 consists of a cylinder type cored motor, and also, has a cylinder shaped metal housing 2 with diameter approximately 4 mm and length approximately 10 mm to promote compactness. A stator consisting of a permanent magnet having N and S poles is fixed to the inner wall surface of the housing 2, and a rotor on which a coil is wound on an iron core is housed inside the housing 2. At the center of this rotor is fixed a rotation shaft 3 which is supported by a bearing inside the housing 2, and the tip part of this rotation shaft 3 projects from the front end of the housing 2.

Inside the housing 2, a commutator is fixed to the back end of the rotation shaft 3, and a left-right pair of brushes are in sliding contact with this commutator. On each brush is fixed a left-right pair of plate shaped connection terminals 4 extending in the direction orthogonal to the rotation shaft 3. The back ends of the connection terminals 4, which are arranged in an opposing and parallel state, project from the resin bracket 5 fixed to the back end of the housing 2. This bracket 5 functions as a cover for the back end opening of the housing 2 and is fixed to the housing 2 by claw parts 2a and 2b projecting in the rotation axis line L direction from the back end of the housing 2 being bent toward the inside of a V shape at the edge of the bracket 5.

The upper claw part 2a is bent into the inside of a recess 5a formed on a back surface 5c of the bracket 5, and the lower claw part 2b is bent into the inside of a recess 5b formed on the back surface 5c of the bracket 5. By using this kind of claw part 2a and 2b, it is possible to fix the bracket 5 to the housing 2 without using an adhesive agent. Also, on the bottom part of the bracket 5, a pedestal part 5d is provided projecting toward the front from the back end side along the surface of the housing 2.

Furthermore, on the tip part of the rotation shaft 3, a roughly semicylinder shaped weight 6 is fixed by swaging or press fitting, and the gravity center of the weight 6 is eccentric toward the rotation axis line L of the rotation shaft 3. Therefore, by doing high speed rotation of the weight 6 with the rotation force of the rotation shaft 3, it is possible to vibrate the housing 2 itself at high speed. This kind of weighted vibration motor 1 is used in the case of alerting a user to an incoming call by vibrating the casing of a device such as a mobile compact wireless device, a mobile phone or the like, for example. For example, this is used when a game machine controller or the like is vibrated to give a realistic sense to the user, or when causing a vibration when a touch panel is touched.

Through holes 7 in which the left-right pair of connection terminals 4 are projected are formed on the bracket 5. At the back surface 5c of the bracket 5, a bulging part 5A jutting toward the back is provided between the through holes 7. Then, a pair of the connection terminals 4 are arranged at a position so as to sandwich this bulging part 5A at left and right, and a pair of the claw parts 2a and 2b are arranged at a position so as to sandwich the bulging part 5A at top and bottom.

Figure 4:
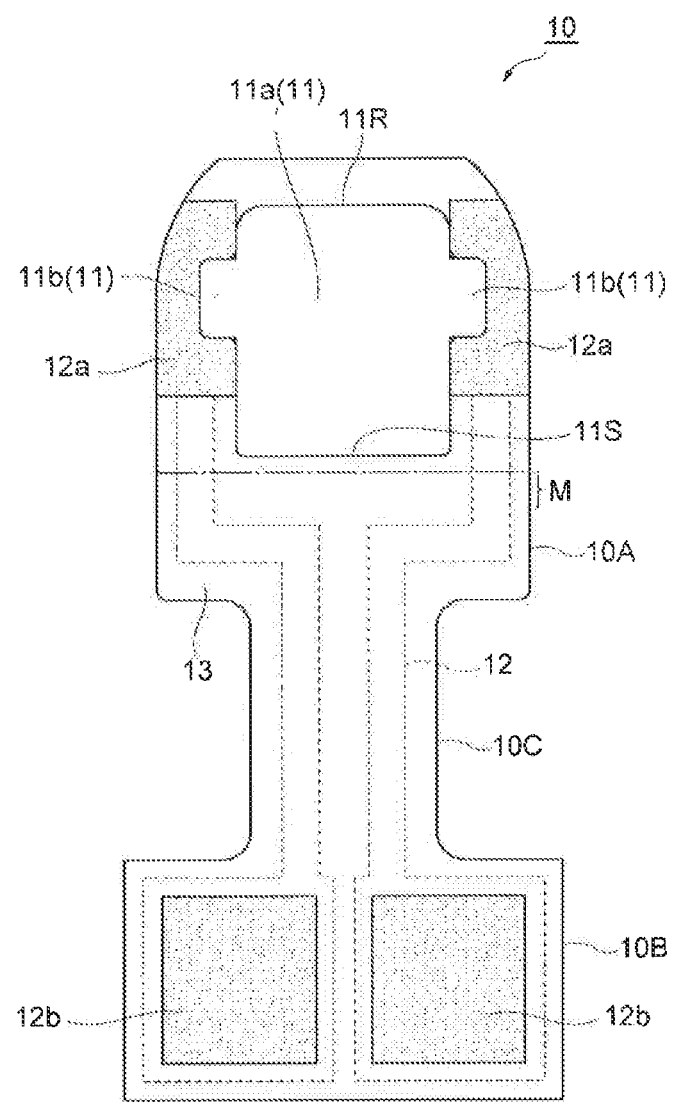
FIG. 4 is a plan view showing the FPC.

As shown in FIG. 4, the FPC 10 consists of a motor side junction part 10A that abuts the back surface 5c of the bracket 5, a device side junction part 10B such as a mobile phone or the like, and an extension part 10C that is made to extend with a narrow width arranged between the motor side junction part 10A and the device side junction part 10B. Then, a left-right pair of wiring patterns 12 extending across from the motor side junction part 10A to the device side junction part 10B is formed on the surface of the FPC 10. The wiring pattern 12 is printed on a resin substrate of the FPC 10, and the wiring pattern 12 is covered by a cover layer 13 for exposing an electrical bonding location 12a of the motor side junction part 10A and an electrical bonding location 12b of the device side junction part 10B.

An opening part 11 in which the bracket 5 bulging part 5A and each connection terminal 4 is inserted is formed on the motor side junction part 10A. This opening part 11 is constituted by a first opening part 11a in which the bracket 5 bulging part 5A is inserted and a second opening part 11b formed in a convex shape at left and right at the edge part of the first opening part 11a. Then, the electrical bonding locations 12a of the motor side junction part 10A are arranged so as to enclose the second opening parts 11b, and the electrical bonding locations 12a and the connection terminals 4 are electrically connected by solder H (see FIG. 5).

As shown in FIG. 1 through FIG. 4, a left-right pair of projecting parts 13 are provided projecting toward the bottom side of the bracket 5 on the bulging part 5A of the back surface 5c side of the bracket 5, and a board insertion groove S is formed extending in the direction orthogonal to the rotation axis line L between the projecting part 13 and the back surface 5c of the bracket 5. Of the sides forming the rectangular first opening part 11a on the board insertion groove S, the first side 11S on the side farthest from the end part of the FPC 10 is inserted. This first side 11S extends in the direction orthogonal to the rotation axis line L, so it is reliably inserted inside the board insertion groove S. Also, a recess 5b is formed between the left and right projecting parts 13.

On each of the projecting parts 13 is formed a convex curved part 13a so that the width of the board insertion groove S expands toward the bracket 5 bottom side. When using this kind of curved part 13a, it is possible to have the curvature of the bent part M of the FPC 10 (see FIG. 4) depend on the curved part 13a and always be kept fixed, and by doing this, it is possible to keep the load applied to the wiring pattern 12 of the FPC 10 fixed at the bent part M, and it is possible to make it more difficult for peeling and cracks of the wiring pattern 12 to occur.

The wiring pattern 12 of the FPC 10 is extended to avoid the bent part M position at which the projecting part 13 abuts the FPC 10 (see FIG. 4) when the FPC 10 is bent via the projecting part 13. Using this kind of constitution makes it so that when the projecting part 13 touches the FPC 10, the projection part 13 does not directly damage the wiring pattern 12. Therefore, it is possible to do a good job of avoiding peeling and cracking of the wiring pattern 12.

Figure 5:
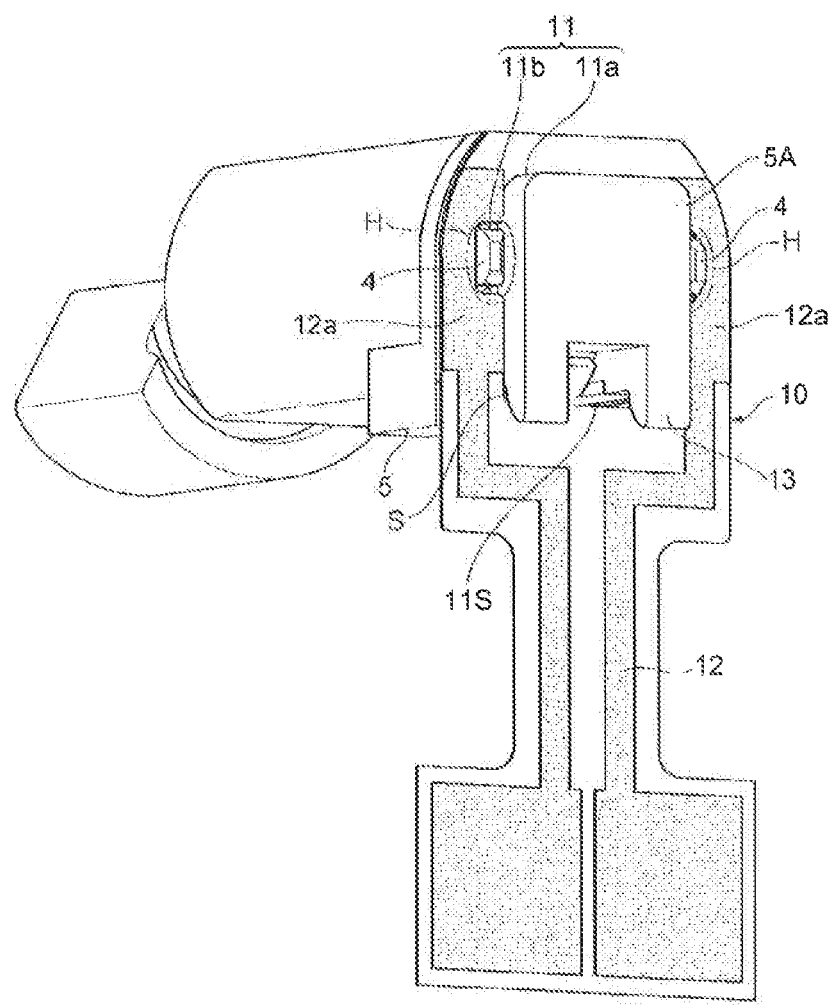
FIG. 5 is a perspective view showing the state with the FPC soldered on the motor.

As shown in FIG. 5, when attaching the FPC 10 to the bracket 5, while inserting the bulging part 5A of the bracket 5 inside the opening part 11 of the FPC 10, one side 11S of the first opening part 11a of the FPC 10 is inserted in the board insertion groove S of the bracket 5. After that, the bracket 5 bulging part 5A and the connection terminal 4 are completely fit into the inside of the opening part 11 of the FPC 10. In this state, the FPC 10 electrical bonding location 12a and the connection terminal 4 are electrically bonded by solder H.

Figure 6:
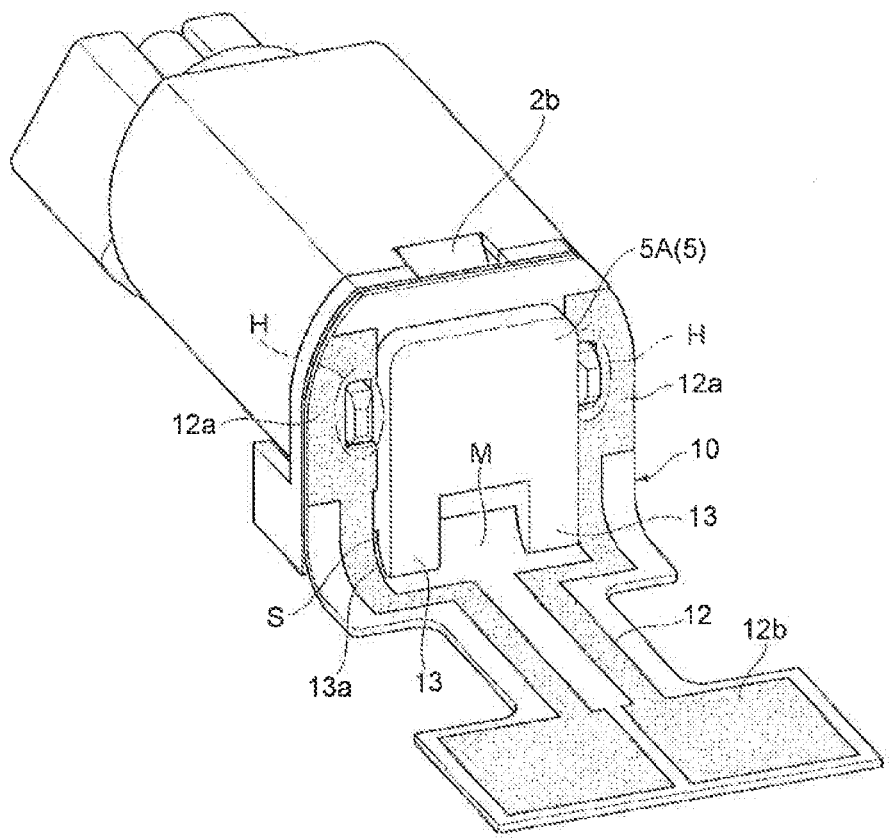
FIG. 6 is a perspective view showing the FPC attached to the motor in a bent state.
Figure 7:
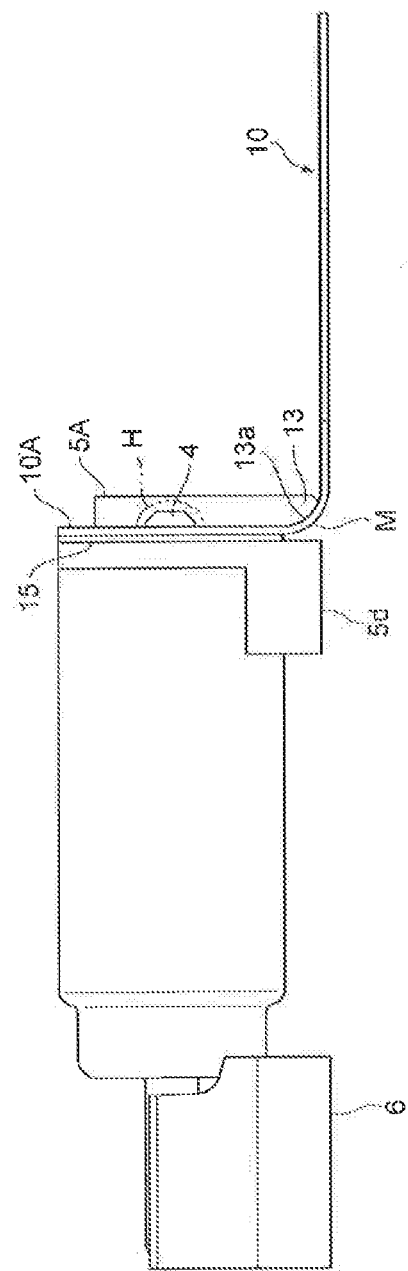
FIG. 7 is a side view showing the FPC attached to the motor in a bent state.

As shown in FIG. 6 and FIG. 7, with the compact motor 1 described previously, when the FPC 10 inserted inside the board insertion groove S is bent toward the back, the FPC 10 is in a state following, specifically, a state abutting the curved part 13a of the projecting part 13, so the curved part 13a of the projecting part 13 restricts the bending position of the FPC 10, and by doing this, the bending of the FPC 10 is stabilized, and it is possible to reliably bend the FPC 10 at the preset position.

If there is no projecting part or board insertion groove, there is no stabilization of the FPC bending position, and the bending force is applied to the connection location (solder part) of the connection terminals and the wiring pattern, so it is easier for solder peeling, peeling of the wiring pattern from the substrate, and cracking of the wiring pattern to occur. Furthermore, it is possible to connect the connection terminals 4 and the wiring pattern 12 using solder H in a state with the FPC 10 inserted inside the board insertion groove S (see FIG. 5), so preliminary fixing of the FPC 10 before doing soldering work is possible, and as a result, it is possible to reliably align the connection terminals 4 and the electrical bonding locations 12a of the wiring pattern 12, making the soldering work easier.

Also, as shown in FIG. 7, on the back surface of the motor side junction part 10A of the FPC 10, a reinforcing plate 15 using a thin plate made of resin is fixed using an adhesive agent. The FPC 10 itself which has a thin thickness of about 0.1 mm has flexibility, so by using the reinforcing plate 15, it is possible to prevent bending or warping of the FPC 10 motor side junction part 10A, and it is possible to reliably adhere the motor side junction part 10A to the back surface 5c of the bracket 5. In fact, the FPC 10 is thin, so with the reinforcing plate 15, it is possible for heat to escape during soldering and to prevent peeling of the wiring pattern 12.

The present invention is not limited to the embodiments described above, and can have various modifications in a scope that does not stray from the gist of the present invention.

Figure 8:
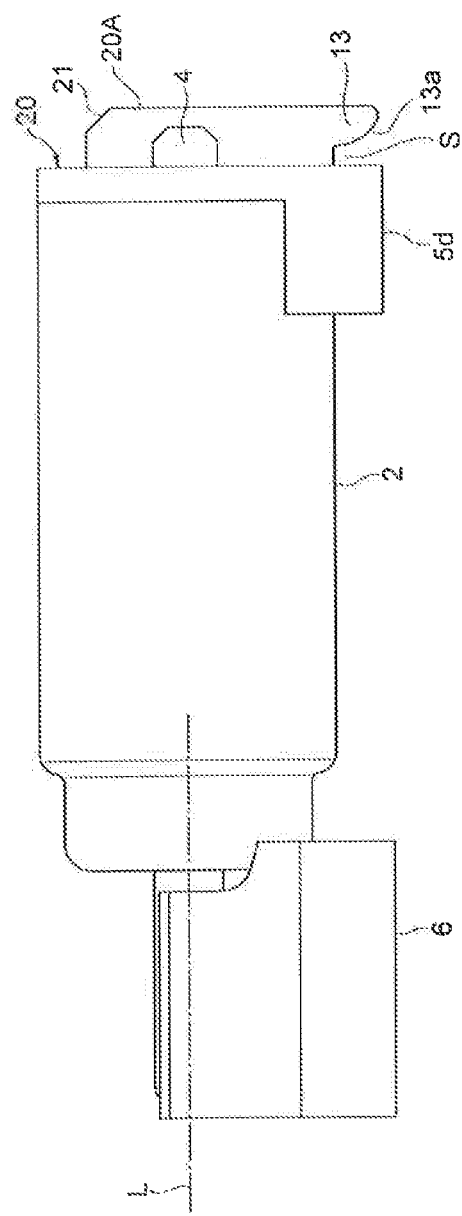
FIG. 8 is a side view showing a second embodiment of the compact motor of the present invention.
Figure 9:
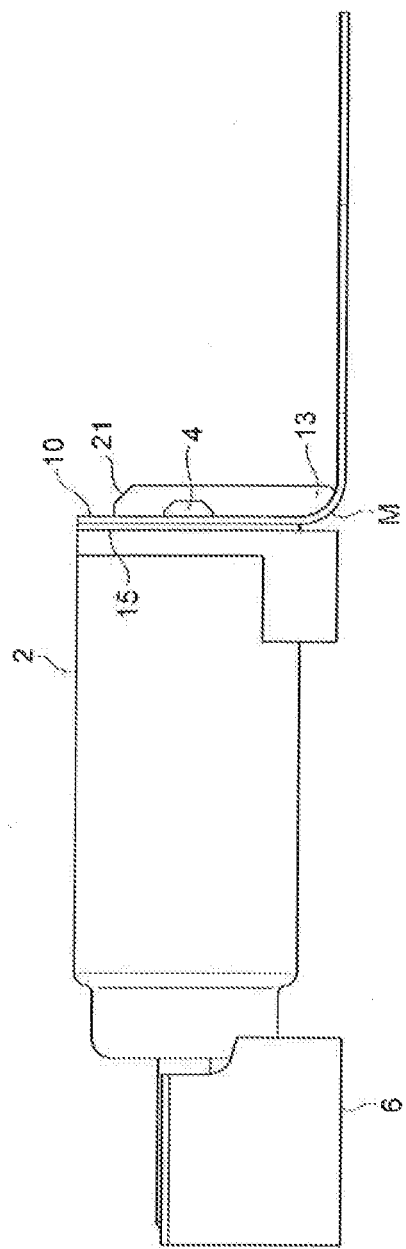
FIG. 9 is a side view showing the FPC in a state fixed to the motor shown in FIG. 8.

For example, as shown in FIG. 8 and FIG. 9, on a bracket 20, a chamfered part 21 that is chamfered at a position facing the projecting part 13 is formed within the plane orthogonal to the rotation axis line L, and this chamfered part 21 extends orthogonally to the rotation axis line L. When the bracket 20 bulging part 20A and the connection terminal 4 are completely fit inside the opening part 11 of the FPC 10, using the chamfered part 21, of the sides forming the rectangular first opening part 11a, the second side 11R near the edge part of the FPC 10 can be smoothly moved after facing the bracket 20. Specifically, it is easy to put the bulging part 20A inside the opening part 11a using the chamfered part 21. The chamfered part 21 can also be a round plane.

Figure 10:
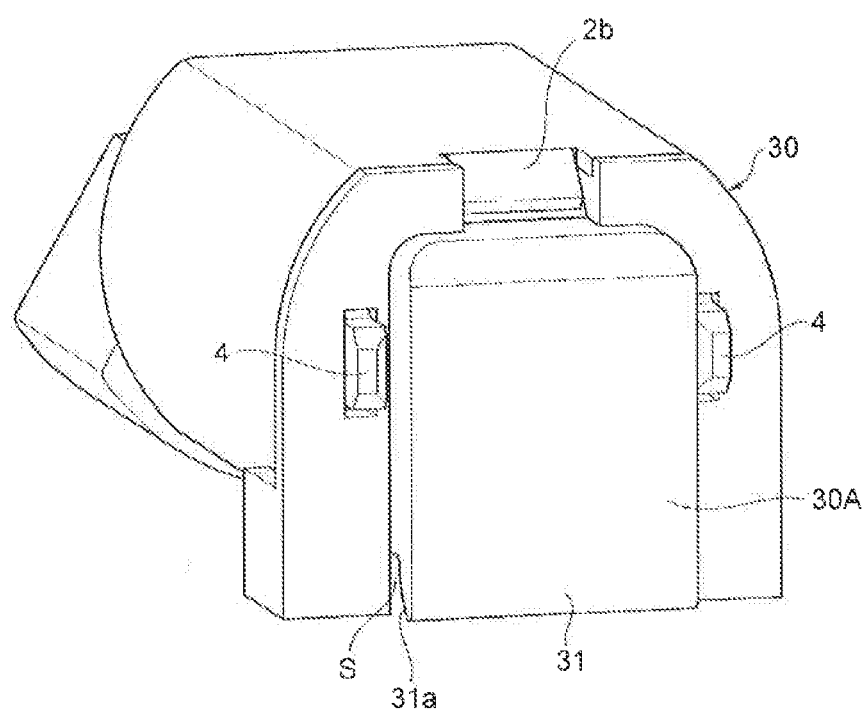
FIG. 10 is a perspective view showing a third embodiment of the compact motor of the present invention.
Figure 11:
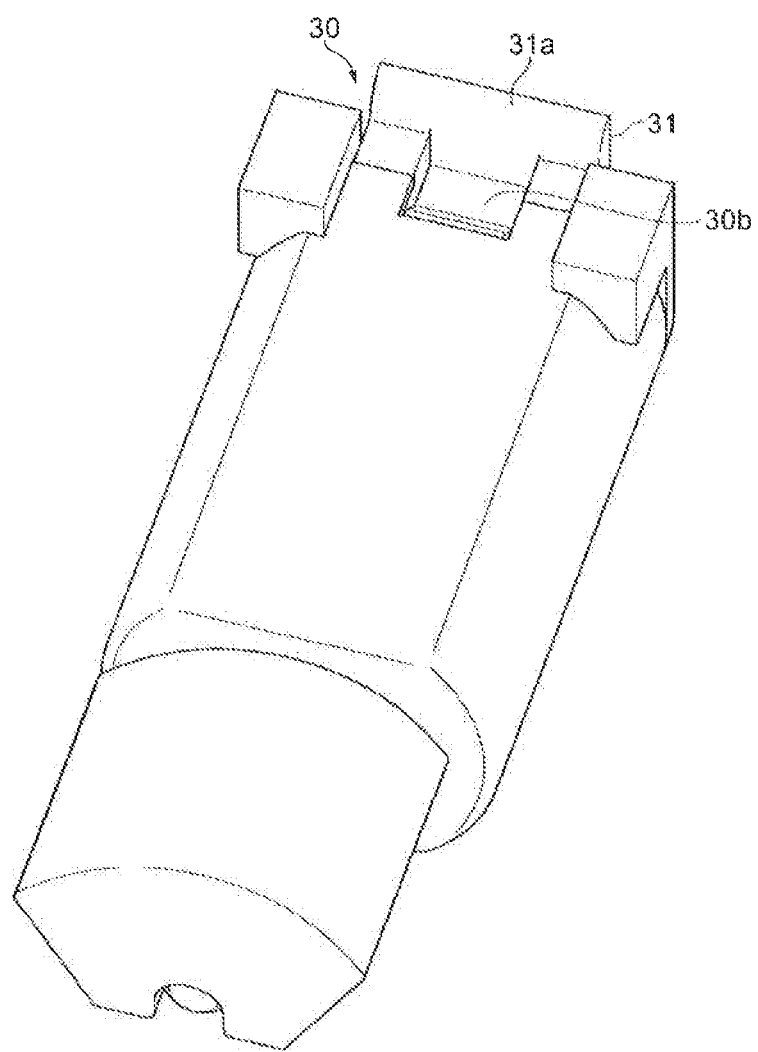
FIG. 11 is a perspective view of the motor shown in FIG. 10 seen from a different angle.

As shown in FIG. 10 and FIG. 11, on a bracket 30, in the direction orthogonal to the rotation axis line L, a projecting part 31 is provided extending along the full length of a bulging part 30A, and a curved part 31a is formed on the projecting part 31. In this case, on the bracket 30, a recess 30b for inserting a claw part 2b is formed between the projecting part 31 and the housing 2.

Figure 12:
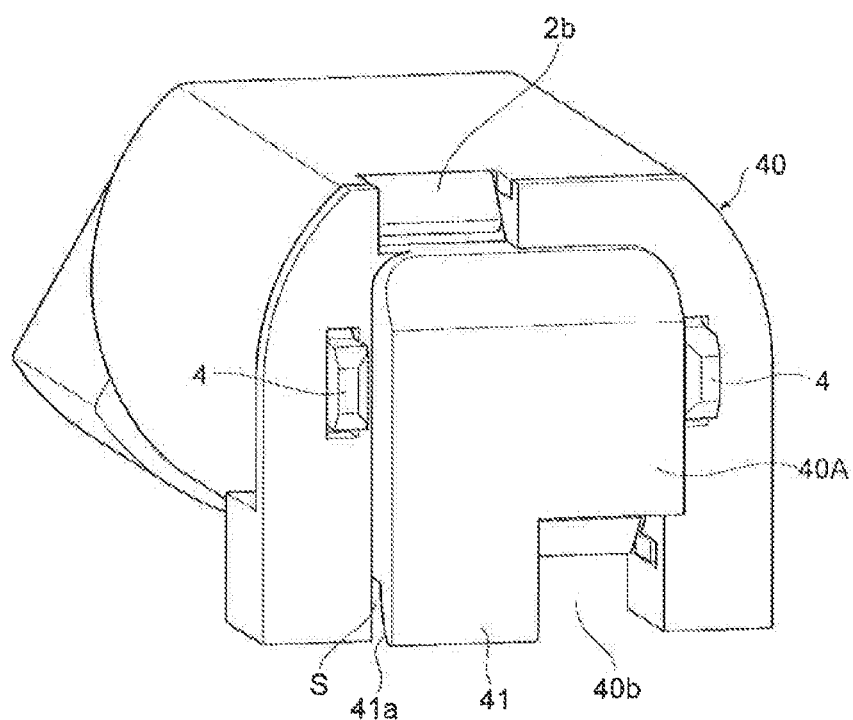
FIG. 12 is a perspective view showing a fourth embodiment of the compact motor of the present invention.
Figure 13:
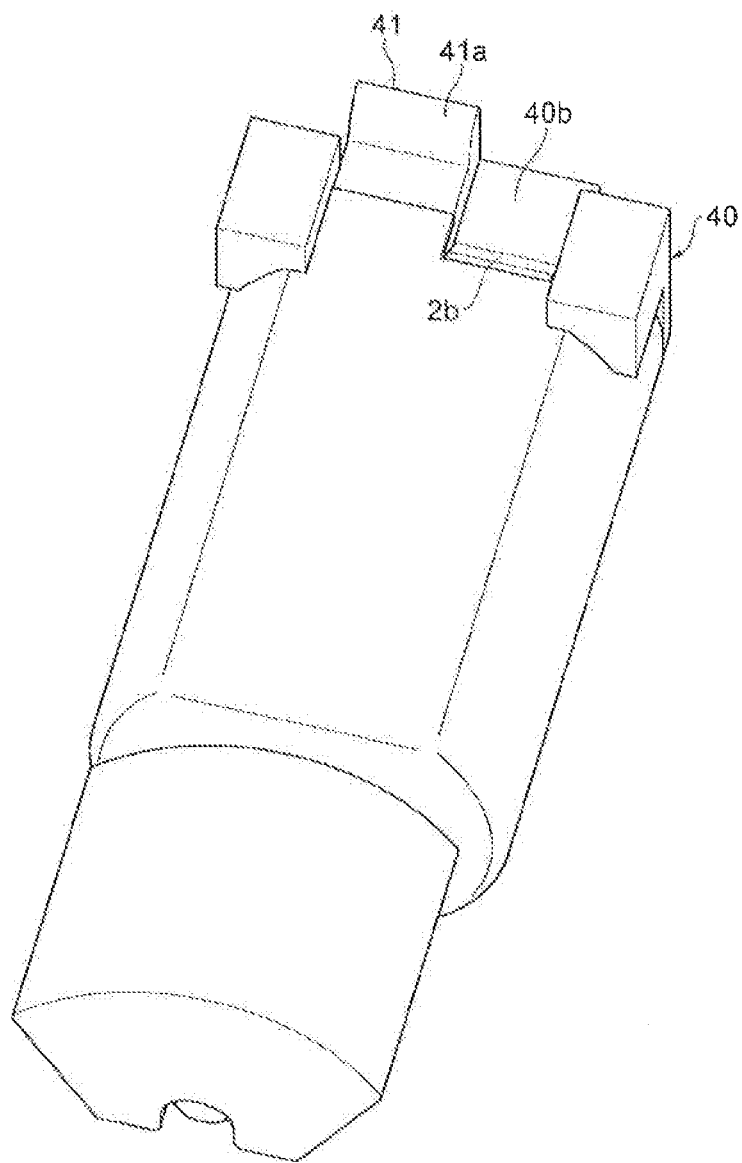
FIG. 13 is a perspective view of the motor shown in FIG. 12 seen from a different angle.

As shown in FIG. 12 and FIG. 13, on a bracket 40, in the direction orthogonal to the rotation axis line L, a projecting part 41 is provided extending along half the full length of the bulging part 30A, and a curved part 41a is formed on the projecting part 41. In this case, a recess 40b for inserting the claw part 2b is juxtaposed on the projecting part 41 in the direction orthogonal to the rotation axis line L.

Moreover, this is not limited to having the projecting part projecting facing the bottom part of the bracket. The projecting part can also project toward the outside in the radial direction of the compact motor 1.

Figure 14:
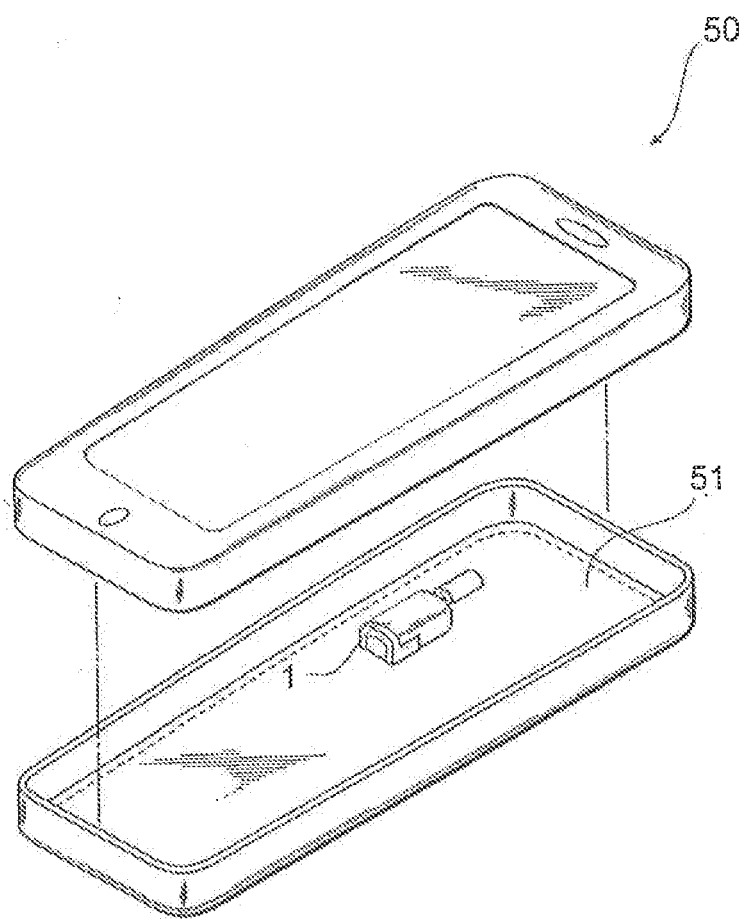
FIG. 14 is a drawing showing a mobile communication device equipped with a motor.

As shown in FIG. 14, it is possible to incorporate a vibration motor 1 inside the casing of a smart phone 50 and form a mobile communication device having a vibration notification function. By electrically connecting a circuit board 51 of the smart phone 50 and the FPC 10 of the vibration motor 1, it is possible to use the vibration motor 1 as a vibration generating source. For example, a vibration is generated when a phone call is coming in to the mobile communication device, or when the mobile communication device is operated.

Figure 15:
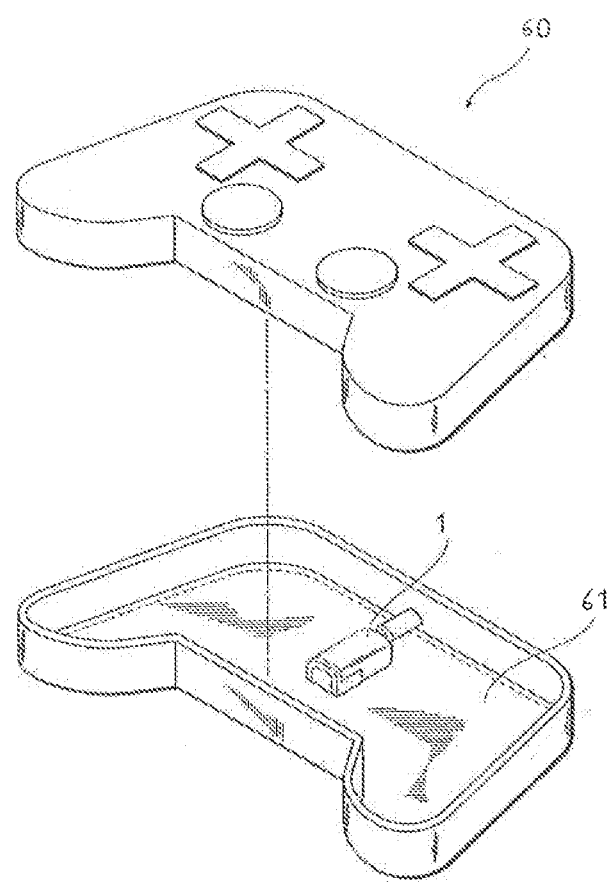
FIG. 15 is a drawing showing a game device equipped with a motor.

Also, as shown in FIG. 15, it is possible to incorporate the vibration motor 1 inside the case of the game machine controller 60, and to form a game device having a vibration notification function. By electrically connecting a circuit board 61 of the controller 60 and the FPC 10 of the vibration motor 1, it is possible to use the vibration motor 1 as a vibration generating source. The game device can also be a mobile game machine main unit, a pachinko handle or the like. This generates a vibration to match the progress state of the game to give the operator a physical sense of realism.

REFERENCES

1 Vibration motor (compact motor)
2 Housing
4 Connection terminal
5 Bracket
5A Bulging part
5c Bracket back surface
10 Flexible printed circuit board (FPC)
11 Opening part
11S Opening part first side
12 Wiring pattern
13 Projecting part
13a Curved part
20 Bracket
21 Chamfered part
30 Bracket
30A Bulging part
31 Projecting part
31a Curved part
40 Bracket
41 Projecting part
41a Curved part
H Solder
L Rotation axis line
M Bent part
S Board insertion groove

The invention claimed is:
1. A compact motor comprising: a housing having a front end and a back end; an axis of rotation along a motor shaft of the compact motor wherein the back end of the housing is disposed along the axis and is perpendicular to the axis; a bracket comprising a back surface fixed to the back end of the housing, connection terminals provided on the back end of the housing and projecting from the back surface of the bracket away from the front end of the housing; a flexible printed circuit board comprising an end part abutting the back surface of the bracket and a wiring pattern connected to the connection terminals; a projecting part provided on the back surface of the bracket, the projecting part compris- ing a base and a leg, where the base extends from the back surface of the bracket in the direction of the axis and the leg extends from the base in a direction perpendicular to the axis; and a board insertion groove formed between the leg of the projecting part and the back surface of the bracket, the board insertion groove comprising a gap, in the direction of the axis, between the leg of the projecting part and the back surface of the bracket, wherein the flexible printed circuit board is inserted inside the board insertion groove and is bent along the projecting part.

2. The compact motor according to claim 1, wherein the flexible printed circuit board abuts against the projecting part and is bent facing away from the motor and parallel to the axis of rotation.

3. The compact motor according to claim 1, wherein, a convex curved part is formed on the leg of the projecting part so that a gap of the board insertion groove between the leg of the projecting part and the back surface of the bracket expands toward the bracket bottom part.

4. The compact motor according to claim 1, wherein the wiring pattern of the flexible printed circuit board is extended to avoid a position at which the projecting part abuts the flexible printed circuit board when the flexible printed circuit board is bent via the projecting part.

5. The compact motor according to claim 1, wherein the leg of the projecting part is projecting toward a bottom part of the bracket.

6. The compact motor according to claim 5, wherein the flexible printed circuit board abuts against the projecting part and is bent away from the compact motor.

7. The compact motor according to claim 1, wherein a weight is attached to a rotation shaft of the compact motor.

8. A mobile communication device, comprising a compact motor according to claim 7, and a circuit board to which the flexible printed circuit board of the compact motor is connected.

9. A game device, comprising a compact motor according to claim 7 for which the weight is attached to the rotation axis, and a circuit board to which the flexible printed circuit board of the compact motor is connected.

10. The compact motor according to claim 7, wherein the compact motor is incorporated into a mobile communication device comprising a mobile communication device circuit board to which the flexible printed circuit board of the compact motor is connected.

11. The compact motor according to claim 7, wherein the compact motor is incorporated into a game device in which the weight is attached to the rotation shaft, and a game device circuit board is connected to the flexible printed circuit board of the compact motor.

* * * * *